United States Patent
Bratzdrum

(10) Patent No.: US 7,031,876 B2
(45) Date of Patent: Apr. 18, 2006

(54) PROCEDURE AND DEVICE FOR DATA TRANSMISSION BETWEEN A PROCESSING UNIT AND SEVERAL POSITION MEASURING INSTRUMENTS

(75) Inventor: Erwin Bratzdrum, Hallabruck (DE)

(73) Assignee: Dr. Johannes Heidenhain GmbH, Traunreut (DE)

(*) Notice: Subject to any disclaimer, the term of this patent is extended or adjusted under 35 U.S.C. 154(b) by 60 days.

(21) Appl. No.: 10/677,111

(22) Filed: Oct. 1, 2003

(65) Prior Publication Data

US 2004/0128103 A1 Jul. 1, 2004

(30) Foreign Application Priority Data

Oct. 1, 2002 (DE) ......... 102 45 905

(51) Int. Cl.
G01C 17/00 (2006.01)
G01C 19/00 (2006.01)

(52) U.S. Cl. ......... 702/150

(58) Field of Classification Search ......... 702/150–153, 702/176, 85
See application file for complete search history.

(56) References Cited

U.S. PATENT DOCUMENTS

| | | | | |
|---|---|---|---|---|
| 4,982,185 A | | 1/1991 | Holmberg et al. | |
| 5,287,285 A | * | 2/1994 | Tsai et al. | 700/195 |
| 5,687,103 A | * | 11/1997 | Hagl et al. | 702/150 |
| 5,990,638 A | * | 11/1999 | Aoyama et al. | 318/85 |
| 6,091,219 A | * | 7/2000 | Maruo et al. | 318/562 |
| 6,388,906 B1 | | 5/2002 | Ferstenberg | |
| 6,396,030 B1 | * | 5/2002 | Hashimoto et al. | 219/494 |
| 6,421,628 B1 | * | 7/2002 | Thorsander et al. | 702/150 |
| 6,603,672 B1 | | 8/2003 | Deng et al. | |
| 2002/0015389 A1 | | 2/2002 | Wastlhuber et al. | |
| 2002/0015449 A1 | | 2/2002 | Wastlhuber et al. | |
| 2003/0135348 A1 | | 7/2003 | Bratzdrum et al. | |

FOREIGN PATENT DOCUMENTS

| DE | 40 25 025 A1 | 2/1992 |
|---|---|---|
| DE | 197 10 971 A1 | 9/1998 |
| DE | 197 03 270 C2 | 3/1999 |
| DE | 199 17 354 A1 | 10/2000 |
| DE | 100 30 357 A1 | 1/2002 |
| DE | 100 30 358 A1 | 1/2002 |
| DE | 101 62 735 A1 | 7/2003 |

* cited by examiner

Primary Examiner—Bryan Bui
Assistant Examiner—Demetrius Pretlow
(74) Attorney, Agent, or Firm—Brinks Hofer Gilson & Lione

(57) ABSTRACT

A procedure for data transmission between a processing unit and a plurality of position measuring instruments, which are connected to one another in a linear bus topology. Generating a position data request signal from the processing unit and synchronously executing the position data request signal in the plurality of position measuring instruments.

13 Claims, 3 Drawing Sheets

PROCEDURE AND DEVICE FOR DATA TRANSMISSION BETWEEN A PROCESSING UNIT AND SEVERAL POSITION MEASURING INSTRUMENTS

Applicant claims, under 35 U.S.C. §119, the benefit of priority of the filing date of Oct. 1, 2002 of a German patent application, copy attached, Serial Number 102 45 905.3, filed on the aforementioned date, the entire contents of which is incorporated herein by reference.

BACKGROUND OF THE INVENTION

1. Field of the Invention

The present invention relates to a procedure and a device for data transmission between a processing unit and a plurality of position measuring instruments that are joined together in a linear bus topology.

2. Discussion of Related Art

From German Patent Disclosure DE 100 30 358 A1 of the present applicant, both a procedure and a device for serial data transmission between a processing unit and a position measuring instrument are known. Via a digital interface, binary data words in a continuous data stream over two data channels are exchanged between the processing unit and the position measuring instrument. In conjunction with this digital interface, German Patent Disclosure DE 100 30 357 A1 should also be mentioned, in which certain provisions are proposed that are of significance in particular with a view to the most time-determined possible acquisition of position data and storage of position data in the position measuring instrument.

The concept of a digital, serial interface disclosed in these references is in principle not limited to a particular interface physics but can instead be realized in combination with various variants and embodiments of known interface technologies.

In the references, only a so-called point-to-point connection between a single position measuring instrument and a central processing unit—such as a numerical control for a machine tool—is disclosed explicitly. In principle, the provisions described can also be employed with so-called bus topology, however, in which one processing unit is connected to a plurality of position measuring instruments. When high data transmission rates are required, the bus topology provided can in particular be a linear bus topology, in which the individual bus units are connected to one another via individual point-to-point connections. In the direction of the processing unit, data are exchanged between the various bus units by the bucket-chain principle. In this context, the term "bucket-chain principle" is understood to mean the transmission of data from one bus unit to the next bus unit.

In practice, in such bus topologies, significant and variable signal transit times result between the various position measuring instruments and the processing unit. The signal transit times can be ascribed here to the requisite transit times in the connecting lines and the requisite processing times in the various position measuring instruments through which the data must pass in the course of the transmission, because of the aforementioned transmission principle.

Unless additional provisions are made, time-determined—that is, simultaneous—acquisition of measured values by all the position measuring instruments cannot be achieved. For precise further processing of the position data, however, a fundamental prerequisite is the defined or as simultaneous as possible acquisition of measured values and execution of position data request signals.

OBJECT AND SUMMARY OF THE INVENTION

An object of the present invention is therefore to disclose a procedure and a device for data transmission between a processing unit and a plurality of position measuring instruments that are connected to one another in a linear bus topology, and in which it is assured that the acquisition of position data in the position measuring instruments always occurs at defined instants.

This object is attained by a procedure for data transmission between a processing unit and a plurality of position measuring instruments, which are connected to one another in a linear bus topology. Generating a position data request signal from the processing unit and synchronously executing the position data request signal in the plurality of position measuring instruments.

The aforementioned object is also attained by a device for data transmission that includes a processing unit and a plurality of position measuring instruments, which are connected to one another in a linear bus topology. For synchronous execution of a position data request signal sent by the processing unit, the plurality of position measuring instruments each include correction devices that take into account specific delay correction values, so that from a time the position data request signal is generated by the processing unit until synchronous execution of the position data request signal in all the plurality of position measuring instruments. In other words, the identical delay time $T_L$ results for each of the plurality of position measuring instruments if the specific delay correction values are taken into account.

The provisions according to the present invention now assure that even with a bus topology, in the case where position data acquisition is requested, the position data or position measurement values are always acquired in the position measuring instrument and stored in memory at defined instants. Reliable further processing of the position data forwarded to the processing unit is thus assured.

Further advantages and details of the present invention will become apparent from the ensuing description of the accompanying drawings.

DETAILED DESCRIPTION OF THE PREFERRED EMBODIMENTS

Figure 1:
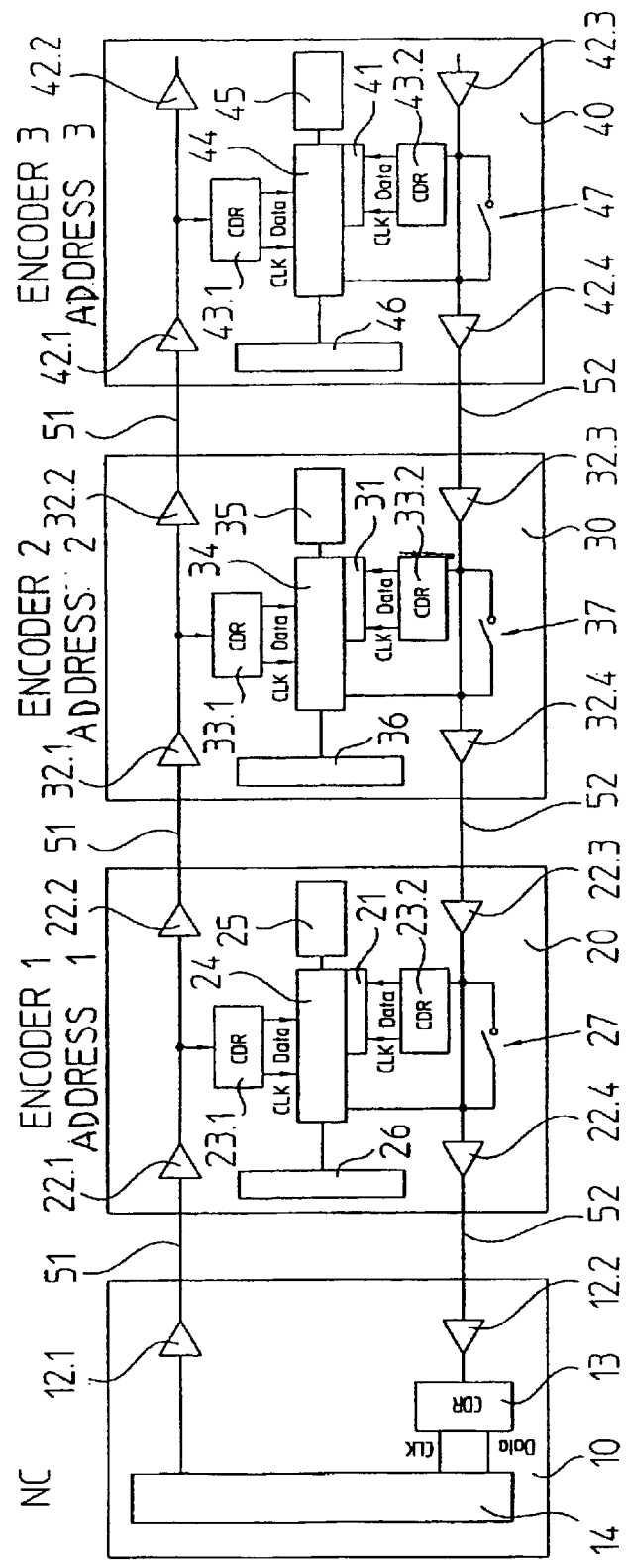
FIG. 1 is a schematic block circuit diagram for a first embodiment of a data transmission device in accordance with the present invention.

In FIG. 1, a block circuit diagram of a first embodiment of the device of a data transmission device is shown schematically. Besides a processing unit 10, the variant shown includes a total of three further position measuring instruments 20, 30, 40, which are connected to one another in a linear bus topology that is known per se. In one possible application, the processing unit 10 (NC) is for instance a numerical control for a machine tool, while the position measuring instruments 20, 30, 40 (ENCODER 1, ENCODER 2, ENCODER 3) are embodied in a known manner as incremental- or absolute-position measuring systems, which for instance detect position data at various machine shafts and transmit them to the processing unit 10 for further processing.

As for the basic mode of data transmission between the processing unit 10 and the position measuring instruments 20, 30, 40, details will not be provided here; instead, the aforementioned DE 100 30 358 A1 and DE 100 30 357 A1 are referred to and their corresponding U.S. Patent Application Publication Nos. US 2002/015389 A1 and US 2002/015449 A1, respectively, the entire contents of each of which is incorporated herein by reference.

In the example shown, a bus topology in the form of a linear bus topology is provided, such that only the first of the total of three position measuring instruments provided is connected, analogously to the configuration from the two references cited, directly to the processing unit 10, and data are exchanged via the data channels 51, 52. Via the first data channel 51, the transmission of data is effected from the processing unit 10 in the direction of the first position measuring instrument 20, and via the second data channel 52, the transmission of data is effected from the first position measuring instrument 20 in the direction of the processing unit 10.

The second position measuring instrument 30 provided is connected serially or in line with the first position measuring instrument 20, and the third position measuring instrument 40 is in turn serially connected to the second position measuring instrument, and it is understood that this configuration can be expanded with further position measuring instruments, which are then likewise connected serially to the third position measuring instrument 40, and so forth. Thus between adjacent bus units, a point-to-point connection is provided in each case; a separate data channel 51, 52 is used for each direction of transmission.

In turn, the result of the linear bus topology is a certain mode of data transmission between the processing unit 10 and the position measuring instruments 20, 30, that is, in particular the first and second position measuring instruments 20, 30, and so forth. It is thus provided that the data to be transmitted from the second position measuring instrument 30, for instance, to the processing unit 10 will be made to pass through the first position measuring instrument 20. This is accomplished in a known manner in the form of buffer storage of the data in a buffer memory 21 of the first position measuring instrument 20. Analogously, the data transmission from the third position measuring instrument 40 which is still farther away from the processing unit 10, and optionally from further position measuring instruments, to the processing unit 10 is effected. Data to be transmitted in the direction of the processing unit 10 are transmitted only to the immediately adjacent position measuring instrument located closer to the processing unit 10. To make this mode of data transmission in the direction of the processing unit 10 possible, each position measuring instrument 20, 30, 40 has a corresponding buffer memory 21, 31, 41. This mode of data transmission, with the linear bus topology selected, will hereinafter be called the bucket-chain principle.

To enable a defined data transmission to certain position measuring instruments 20, 30, 40 and to assure correct further processing of the data received from the various position measuring instruments 20, 30, 40, addressability of the various position measuring instruments 20, 30, 40 is provided in a known manner by linear bus topology. Let this be represented by the respective addresses "ADDRESS 1", "ADDRESS 2", "ADDRESS 3", which are assigned to the various position measuring instruments 20, 30, 40 in FIG. 1.

Accordingly, in the manner described, a transmission of data from the processing unit 10 in the direction of the position measuring instruments 20, 30, 40 used is effected over the first data channel 51; analogously, over the second data channel 52, data in serial form are transmitted as binary data words in a continuous data stream from the individual position measuring instruments 20, 30, 40 in the direction of the processing unit 10.

Figure 2:
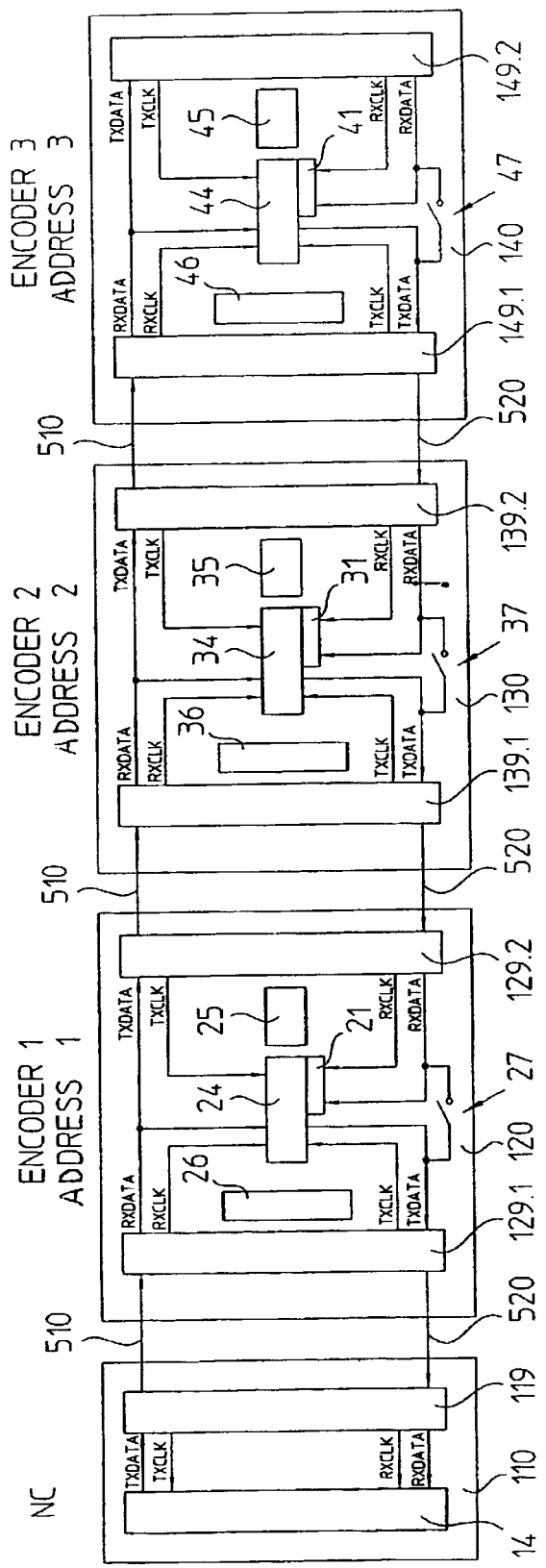
FIG. 2 is a schematic block circuit diagram for a second embodiment of a data transmission device in accordance with the present invention.

In terms of concrete interface physics, in the present example a so-called LVDS (low voltage differential signaling) interface is used for the data transmission; however, as will become clear from the second example in FIG. 2, to be described hereinafter, the particular interface physics is not essential for the present invention. Instead, some alternative interface physics or interface hardware can be employed.

In the present example, for the interface physics selected, in the form of an LVDS interface, it is the line drivers 12.1, 12.2, 22.1–22.4, 32.1–32.4, 42.1–42.4, provided in the processing unit 10 and the position measuring instruments, and the clock/data recovery components 13, 23.1, 23.2, 33.1, 33.2, 43.1, 43.2, used in a known manner for data transmission in the LVDS interface, that are specific.

Both in the processing unit 10 and in the position measuring instruments 20, 30, 40, protocol components 14, 24, 34, 44 are also provided, which prepare the data transmitted, or to be transmitted, in accordance with the transmission protocol.

Also disposed in each of the position measuring instruments 20, 30, 40 is a respective memory 25, 35, 45—embodied for instance as a EEPROM—whose function will be described in further detail in the course of the description hereinafter. The function of switch elements 27, 37, 47, which are also assigned to the position measuring instruments 20, 30, 40, will also be described in further detail hereinafter.

In each of the position measuring instruments 20, 30, 40, the requisite measured value acquisition devices for measured value acquisition, are each shown only as a schematic function block 26, 36, 46; these are for instance the requisite elements of the respective position measuring instrument 20, 30, 40 for generating the position data, such as a measurement graduation and a scanner unit, and so forth. The measured value acquisition devices 26, 36, 46 can in turn be embodied arbitrarily and are not essential to the present invention; for instance, by way of them, either incremental or absolute signals can be generated, it being understood that the most various physical principles for generating measured values can be employed, and so forth.

A second variant of a device according to the present invention is shown schematically in FIG. 2, in which once again a processing unit 110 (NC) is connected to three position measuring instruments 120, 130, 140 (ENCODER 1, ENCODER 2, ENCODER 3) in a linear bus topology. In this example, only the interface hardware or interface physics employed differs from the first variant described; that is, so-called ethernet physics is now employed for data transmission. In FIG. 1, only the communications components 119, 129.1, 129.2, 139.1, 139.2, 149.1, 149.2, in the form of so-called ethernet PHYs, are specific for the ethernet physics; they are each disposed in the processing unit 110 and the position measuring instruments 120, 130, 140, and they assure the data transfer over both data channels 510, 520 in a known manner.

The elements and components also disposed in the processing unit 110 and the position measuring instruments 120, 130, 140 correspond to those from the first exemplary embodiment described and will not be described in further detail here. Elements with the same function are therefore identified by the same reference numerals in FIG. 2 as in FIG. 1.

In conjunction with FIGS. 3a–3d, the procedure of the present invention will now be described in detail in terms of an example, with reference in the ensuing description of the corresponding device to the variant of FIG. 1. In principle, however, the procedure according to the present invention takes an identical course in conjunction with the interface physics of FIG. 2 as well.

Figure 3A:
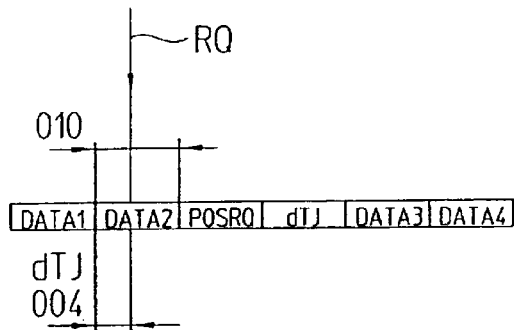
FIGS. 3a–3d each show an example of a signal graph to explain a possible procedure of data transmission in accordance with the present invention as performed in the data transmission device of FIG. 1 and is applicable to the data transmission device of FIG. 2.
Figure 3B:
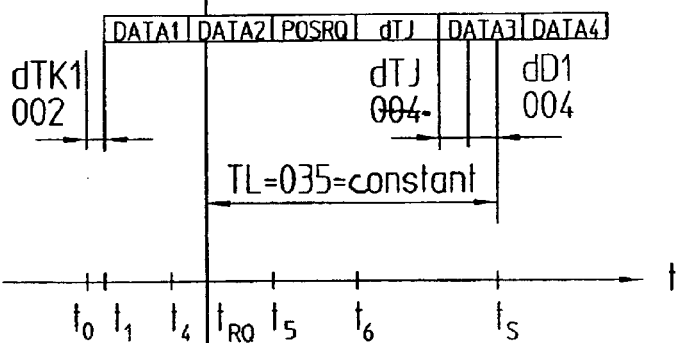
Figure 3C:
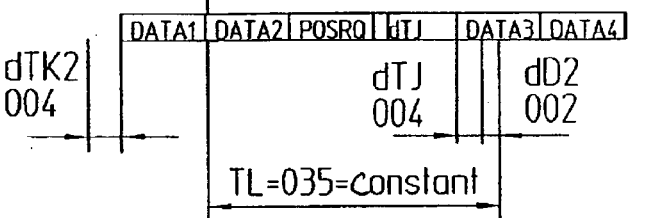
Figure 3D:
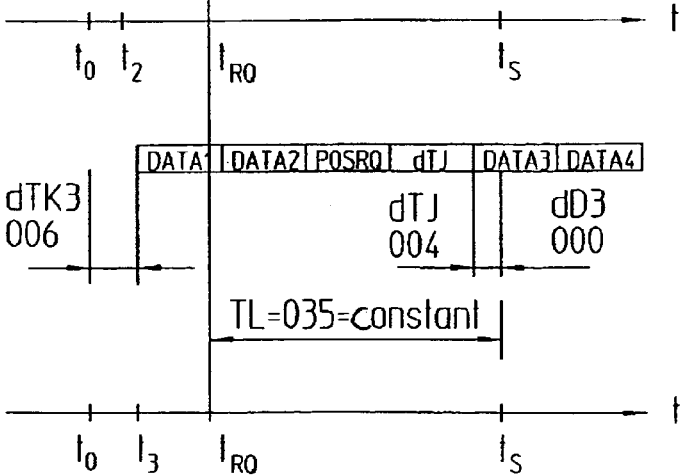

FIG. 3a shows the course of the transmission of data over the first data channel 51 from the processing unit 10 in the direction of the various position measuring instruments 20, 30, 40. FIGS. 3b–3d show the arrival of the data stream, forwarded from the processing unit 10, at the three position measuring instruments 20, 30, 40, along with the processes that are then executed.

At time $t_0$, the processing unit 10 begins to transmit a first digital data word DATA1 to the further bus units or position measuring instruments 20, 30, 40. In the present example, digital data words DATA1–DATA4 with a word length of 10 bits are exchanged between the various bus units; it is understood that in principle, different word lengths could be provided instead. As the duration dDATA for transmitting such a data word DATA1–DATA4, let it be assumed that dDATA=010. The duration dDATA and the further durations will be referred to without specific units of time in the course of the remaining description and are intended solely as examples for the sake of illustration.

As seen from FIG. 3b, the first data word DATA1 arrives at time $t_1$ at the position measuring instrument 20 that in the linear bus topology of FIG. 1 is the shortest distance away from the processing unit 10. The requisite duration dTK= 002 between times $t_0$ and $t_1$ is based on the infinite signal transit time of the data word DATA1 over the signal lines of the data channel 51. This duration will hereinafter be called the signal transit time dTK1.

Analogously, it can be seen from FIGS. 3c and 3d that the corresponding data word DATA1 arrives once again at the two farther-away position measuring instruments 30, 40, at times $t_2$ and $t_3$, in each case delayed by the respective signal transit times dTK2=004 and dTK3=006, respectively. In the case of the signal transit times dTK2, dTK3, only the pure transit times—which are no longer negligible—over the corresponding connecting lines of the data channel 51 make themselves felt; the signal processing times that occur during the passage of the transmitted data through the respective preceding position measuring instruments 10 or 10, 20 in the linear bus topology are also a factor.

After the first data word DATA1 has been transmitted, the transmission of a further data word DATA2 to the position measuring instruments 20, 30, 40 begins at time $t_4$. In the course of the transmission of the second data word DATA2 from the processing unit 10 to the position measuring instruments 20, 30, 40, a position data request signal RQ occurs at time $t_{RQ}$ in the processing unit 10, and by way of this signal, current position data are to be requested, as immediately as possible, for instance by a higher-order regulator, from the various position measuring instruments 20, 30, 40.

The transmission of the data word DATA2, which has not yet been concluded by time $t_{RQ}$, is thereupon completed normally, and not until time $t_5$ is the transmission of a position data request command of a digital 10-bit data word POS_Q from the processing unit 10 to the position measuring instruments 20, 30, 40 begun.

After the completion of the transmission of the data word POS_Q with the position data request command at time $t_6$, the transmission of a further digital data word dTJ ensues. This data word includes chronological position information or a time difference relative to the chronological position of the position data request signal RQ during the transmission of the first data word DATA1. In the present example, dTJ=004. With respect to this transmitted information, DE 100 30 357 A1 already mentioned above is expressly cited here.

The various transmitted data words DATA1, DATA2, POS_Q, dTJ arrive at the position measuring instruments 20, 30, 40 correspondingly delayed by the signal transit times dTK1, dTK2, dTK3, as can be seen from the graphs in FIGS. 3b–3d.

In order now to assure in particular simultaneous execution of the position data request signal RQ, or of the correspondingly prepared data word POS_Q, in all the position measuring instruments 20, 30, 40 at time $t_S$, a specific delay correction value dD1, dD2, dD3 should be taken into account in each position measuring instrument 20, 30, 40. The respective delay correction value dD1, dD2, dD3 results from the aforementioned signal transit times dTK1, dTK2, dTK3, as well as signal processing times to the various position measuring instruments or in the position measuring instruments that may occur, and is a function of the longest signal transit time dTK3 to the farthest-away position measuring instrument 40. As can be seen from FIG. 3d, the corresponding delay correction value for this position measuring instrument 40 is dD3=000; that is, in this position measuring instrument 40, the current position data can be acquired and stored in memory immediately after the transmitted data word dTJ and the time difference dTJ=004 from time $t_S$.

For the other two position measuring instruments 20, 30, which have correspondingly shorter signal transit times, not only the time difference dTJ, but also a respective defined delay correction value dD1=004 and dD2=002 since the transmission of the data word dTJ, have to be taken into account. Only in this way can it be assured that at the identical time $t_S$, the simultaneous measured value acquisition and execution of the position data request signal RQ or of the corresponding data word POS_Q will take place.

Although this cannot be seen from the illustrations in FIGS. 3a–3d, immediately after the time $t_S$ at which the measured value acquisition is effected simultaneously in the position measuring instruments 20, 30, 40, the transmission of the ascertained position data in the direction of the processing unit 10 is begun by all the position measuring instruments. As already explained above, during the transmission of the position data in the direction of the processing unit 10, buffer storage in the buffer memories 21, 31, 41 of the various position measuring instruments 20, 30, 40 is effected on the basis of the bucket-chain principle.

Taking the transit-time-dependent delay correction values dD1, dD2, dD3 into account as explained thus brings about an identical or constant delay time TL=035, in all the position measuring instruments 20, 30, 40, between the occurrence of the position data request signal RQ in the processing unit 10 and the execution of the position data request signal RQ in the position measuring instruments. The aforementioned requirements in terms of the simultaneous acquisition of position data in all the position measuring instruments are thus met with linear bus topology as well.

To make it possible to take the various signal transit times dTK1, dTK2, dTK3 and specific delay correction values dD1, dD2, dD3 into account in the form described, it is necessary, before the actual measuring mode of the entire system, for the specific delay correction values dD1, dD2, dD3 to be ascertained in an initialization phase. For that purpose, via transit time measurement of the signal transit times dTK1, dTK2, dTK3, including any signal processing times that result, are ascertained for each position measuring instrument. The transit time measurement is done in the form of so-called reflection measurement; that is, the required transit time for a signal transmitted from the processing unit 10 to a position measuring instrument and back again is determined. For details of a suitable transit time measurement, see German Patent Application DE 101 62 735.1, which corresponds to U.S. Patent Application Publication US 2003-0135348, the entire contents of which is incorporated herein by reference.

To make a defined transit time measurement for each of the position measuring instruments possible, each of the position measuring instruments provided inside the device of the invention has an assigned switch element 27, 37, 47 in the signal path of the second data channel 52. With the aid of these switch elements 27, 37, 47, it is possible during the respective transit time measurement to select a defined signal path, bypassing buffer storage in the respective position measuring instrument 20, 30, 40.

In the case of measuring the transit time to the first position measuring instrument 20, the associated switch element 27 of the first position measuring instrument 20 should accordingly be closed while the other switch elements 37, 47 remain open, in order to select a signal path for the transit time measurement, that is, to determine the signal transit time dTK1. If the signal transit time dTK2 to the second position measuring instrument 30 is to be determined, then the switch elements 27 and 37 should be closed while the switch element 47 remains open, to make a signal path possible for the transit time measurement in the form of reflection measurement.

As a function of the thus-ascertained signal transit time dTK1, dTK2, dTK3 for the applicable position measuring instrument 20, 30, 40, the corresponding delay correction value dD1, dD2, dD3 is then determined. This is done as described, by providing that synchronous execution of the position data request signal RQ is possible for all the position measuring instruments 20, 30, 40. The determination of the corresponding delay correction value dD1, dD2, dD3 depends, as described above, on whatever is the longest ascertained signal transit time between the processing unit 10 and a bus unit or position measuring instrument 20, 30, 40. Concretely, the determination of the applicable delay correction value is done as follows in this example:

$$dD1 = dTK3 - dTK1 = 004$$

$$dD2 = dTK3 - dTK2 = 002$$

$$dD3 = dTK3 - dTK3 = 000.$$

In general, the resultant delay correction value $dDn$ of the $n^{th}$ position measuring instrument is accordingly:

$$dDn = dTKmax - dTKn,$$

in which
$dDn$ = specific delay correction value of the $n^{th}$ position measuring instrument
$dTKmax$ = maximum signal transit time to a position measuring instrument in the bus topology
$dTKn$ = signal transit time of the $n^{th}$ position measuring instrument.

The resultant delay time TL between the occurrence of the position request signal RQ at time $t_{RQ}$ and the time $t_S$ at which execution of this command occurs is composed additively of the required duration for transmitting a defined, minimal number of digital data words, that is, the data words DATA2, POS_Q, dTJ, and the duration of the delay correction value dD1, dD2, dD3.

Once the transit time measurement has been performed for all the position measuring instruments 20, 30, 40, the ascertained specific delay correction value dD1, dD2, dD3 is then stored in a memory 25, 35, 45 of the respective position measuring instrument 20, 30, 40, where it is available, in the manner explained, in the measurement mode itself. In one possible embodiment, such a memory 25, 35, 45 is embodied as a EEPROM, for instance.

To enable taking specific delay correction values dD1, dD2, dD3 into account in the manner described, the device of the invention, or in other words the corresponding position measuring instruments, accordingly each have suitable correction means. The correction means include, among other elements, the respective memories 25, 35, 45, in which the delay correction values dD1, dD2, dD3 are stored.

Besides the exemplary embodiments described, it is understood that alternative variants also exist within the scope of the present invention.

I claim:

1. A procedure for data transmission between a processing unit and a plurality of position measuring instruments, which are connected to one another in a linear bus topology, the procedure comprising:

generating a position data request signal from said processing unit; and synchronously executing said position data request signal in said plurality of position measuring instruments, wherein said synchronously executing comprises:

taking into account a specific delay correction value for each position measuring instrument, so that from a time said position data request signal is generated by said processing unit until said synchronously executing said position data request signal in said position measuring instruments, an identical delay time results in each of said position measuring instruments.

2. The procedure of claim 1, wherein each of said specific delay correction values is selected as a function of a signal transit time between said processing unit and an applicable one of said plurality of position measuring instruments.

3. The procedure of claim 2, wherein each of said specific delay correction values of each of said plurality of position measuring instruments is ascertained in an initialization phase prior to a measurement mode of said plurality of position measuring instruments.

4. The procedure of claim 3, wherein each of said respective ascertained delay correction values is stored in a corresponding memory, which is assigned to respective ones of said plurality of position measuring instruments.

5. The procedure of claim 2, wherein each of said respective delay correction values is determined as a function of all said ascertained signal transit times, in such a way that for all said plurality of position measuring instruments, synchronous execution of said position data request signal in said plurality of position measuring instruments is possible.

6. The procedure of claim 1, wherein said delay time is composed additively of a length of time for transmitting a defined, minimum number of digital data words and an associated length of time of an associated one of said delay correction values.

7. The procedure of claim 1, wherein transmission in said linear bus topology by said plurality of position measuring instruments to said processing unit is effected by a bucket-chain principle.

8. The procedure of claim 7, wherein during said transmission of position data, storage of said position data is effected in buffer memories of said plurality of position measuring instruments.

9. The procedure of claim 1, wherein immediately after said simultaneous execution of said position data request signal in said plurality of position measuring instruments, ascertained position data are transmitted in a direction of said processing unit.

10. A device for data transmission, comprising:
a processing unit;
a plurality of position measuring instruments, which are connected to one another in a linear bus topology, wherein, for synchronous execution of a position data request signal sent by said processing unit, said plurality of position measuring instruments each include correction devices that take into account specific delay correction values, so that from a time said position data request signal is generated by said processing unit until synchronous execution of said position data request signal in all said plurality of position measuring instruments, an identical delay time results for each of said plurality of position measuring instruments.

11. The device of claim 10, wherein each of said correction devices comprises a corresponding memory, in which corresponding ones of said specific delay correction value are stored.

12. The device of claim 10, wherein each of said plurality of position measuring instruments comprises a buffer memory, in which, during the transmission of position data to said processing unit, which is done by a bucket-chain principle, storage of said position data is effected.

13. The device of claim 10, wherein each of said plurality of position measuring instruments comprises an actuatable switch element, by way of which signal transmission by respective ones of said plurality of position measuring instruments can be interrupted.

* * * * *